Nov. 28, 1939.    R. H. FLEET ET AL    2,181,656
BRAKING METHOD AND DEVICE FOR AIRPLANE LAUNCHING SYSTEMS
Filed Nov. 25, 1936    2 Sheets-Sheet 1
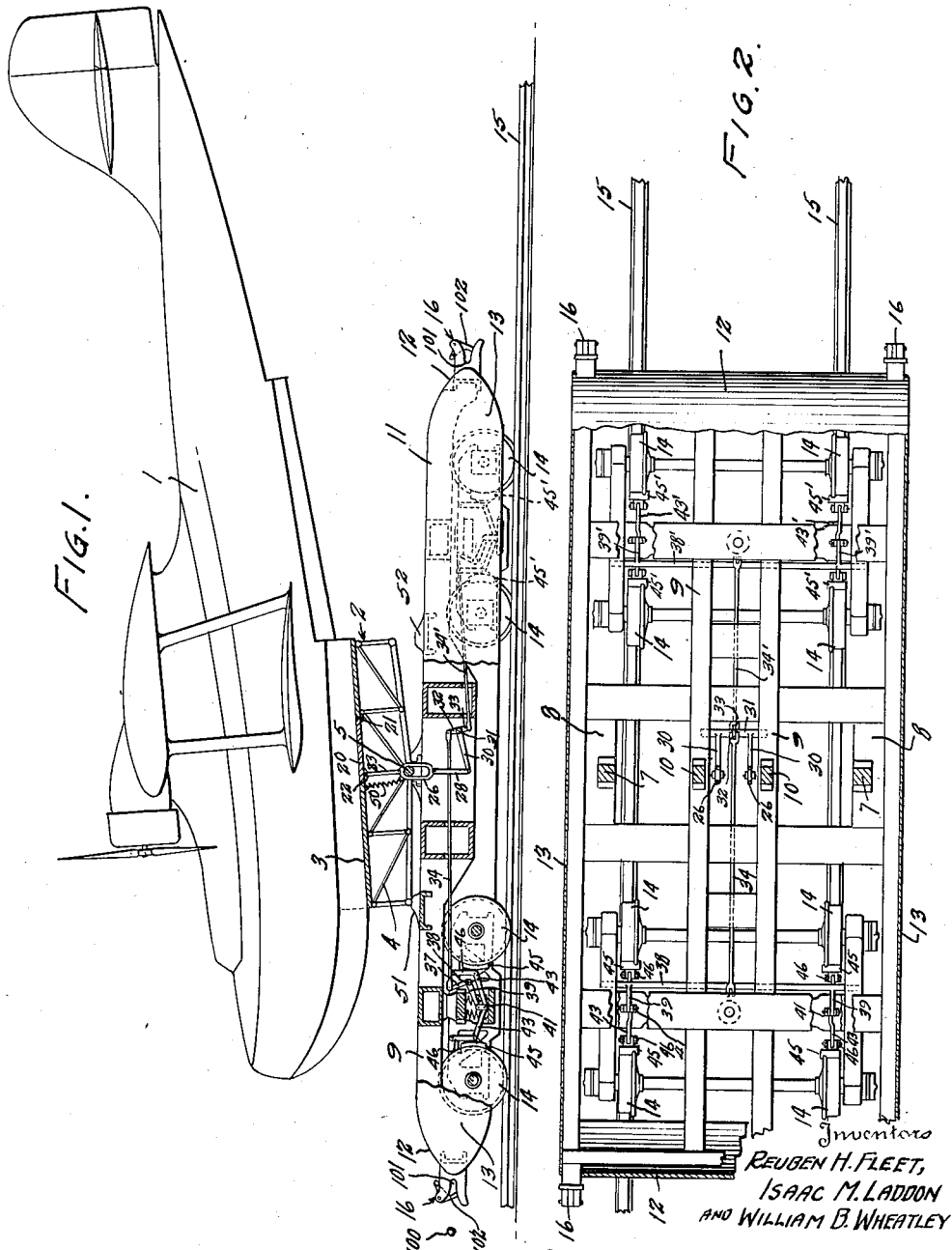
Inventors
REUBEN H. FLEET,
ISAAC M. LADDON
AND WILLIAM B. WHEATLEY
By Semmes & Semmes
Attorneys Nov. 28, 1939.    R. H. FLEET ET AL    2,181,656
BRAKING METHOD AND DEVICE FOR AIRPLANE LAUNCHING SYSTEMS
Filed Nov. 25, 1936    2 Sheets-Sheet 2
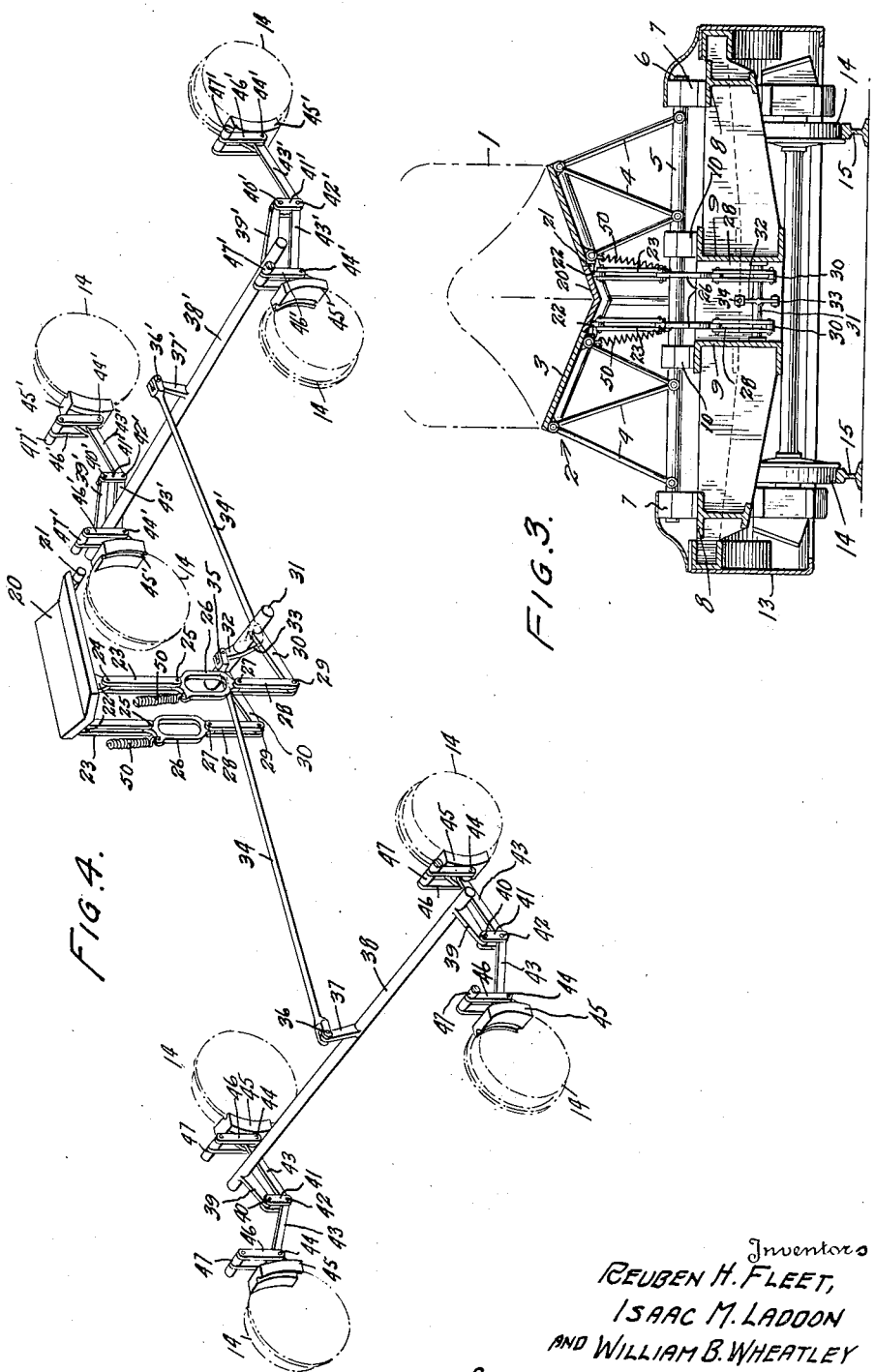
Inventors
REUBEN H. FLEET,
ISAAC M. LADDON
AND WILLIAM B. WHEATLEY
By Semmes & Semmes
Attorneys Patented Nov. 28, 1939

2,181,656

UNITED STATES PATENT OFFICE 2,181,656

BRAKING METHOD AND DEVICE FOR AIRPLANE LAUNCHING SYSTEMS

Reuben H. Fleet, William B. Wheatley, and Isaac M. Laddon, San Diego, Calif.

Application November 25, 1936, Serial No. 112,802

10 Claims. (Cl. 244—63)

Our invention relates to means for launching airplanes, either a land type or a seaplane type.

This application is an improvement upon our application Serial No. 105,610, filed October 14, 1936.

In the application above identified, we have shown a vehicle mounted on a rail track upon which vehicle airplanes may be mounted. The vehicle is driven down the track and the airplane takes off from the vehicle when flying speed has been attained. The vehicle may be motor driven, but preferably the vehicle and the airplane are driven by the power plant of the airplane.

In the system shown in our application, means for arresting the vehicle after the airplane has left it, comprised arresting gear cables which engage catch elements on the car which the airplane is supported. At high speeds the arresting forces to which the moving parts of the arresting gear are subjected are great.

Airplane as used herein broadly includes land airplanes, seaplanes, flying boats, amphibians and any other heavier-than-air-aircraft. Body element and body unit as used herein broadly includes a land airplane fuselage, a flying boat airboat or amphibian hull, and the equivalent of a body in the case of a flying wing airplane having no external body.

This invention has for one of its objects the minimization of the forces exerted in stopping the car from which an airplane is launched.

Another object of the invention is to provide a braking system carried by a car from which an airplane is launched which will be automatically applied upon the airplane taking off from the car.

Yet another object of this invention is to provide a system for the application of brakes on a car from which an airplane is launched which is simple in construction, sturdy, and easy to repair and replace.

With these and other objects in view, which may be incident to our improvements, the invention consists in the parts and combinations to be hereinafter set forth and claimed, with the understanding that the several necessary elements comprising our invention may be varied in construction, proportions and arrangement, without departing from the spirit and scope of the appended claims.

It is obvious that our system for the application of brakes on a car can be used even though the car is not mounted on a track; that is to say, the vehicle may be directed down the runway of an airport, upon which runway tracks are not located. However, one of the features of our system is that the direction of the takeoff is determined by the track, and preferably we employ tracks at the airport.

The advantages of our system of launching are fully set forth in the above identified application, and need not be here repeated.

In order to make our invention more clearly understood, we have shown in the accompanying drawings means for carrying the same into practical effect without limiting the improvements in their useful applications to the particular constructions which, for the purpose of explanation, have been made the subject of illustration.

Referring to the drawings:

Figure 1 is a view in side elevation of our device with an airplane mounted on it, part of the structure being broken away and other parts being shown in section.

Figure 2 is a top plan view of a car with the top of the car broken away to show the construction and operation of the parts.

Figure 3 is a sectional view taken from the front of the car with portions of the construction shown in section to more clearly illustrate the constructional details.

Figure 4 is a perspective view of the braking system proper, showing the linkages.

Referring to the drawings, we have shown a seaplane 1 which is mounted on a cradle 2 which comprises a V-shaped upper portion 3 and braking structure 4.

The cradle 2 is pivoted on a shaft 5 which is journaled at 6 on supports 7 which rest on frame members 8 on the sides of the car. Down the center of the car are longitudinally disposed beams 9 which carry support elements 10 in which the shaft 5 is likewise journaled.

The car is provided with a top 11 and ends 12. The ends 12 are streamlined. The top 11 and the ends are covered with a covering 13 which comes down over wheels 14 to cut down air resistance. The wheels 14 are adapted to travel on rails 15.

At either end of the car are arresting gear catches 16 described in detail in our copending application Serial No. 105,611, filed October 14, 1936.

The upper surface 3 of the cradle is provided with a V-shaped contact member 20 which is pivoted on a shaft 21 suitably journaled in the structure of the cradle. The member 20 has downwardly projecting ears 22 to which are attached link pieces 23. The link pieces 23 are pivoted at 24 on the ears 22. There are two link pieces for each ear.

The link pieces 23 are pivoted at 25 to two loop members 26 which fit over the shaft 5, the shaft 5 passing through the loops in the members 26.

To the bottom of each loop member 26 are pivoted at 27 the lower link members 28 which are pivoted at 29 to rocker arms 30 of a shaft 31. The shaft 31 is journaled on the longitudinally disposed beams 9.

The shaft 31 has mounted on it an arm 32 whose movement is adapted to operate the braking system for the front wheels of the car and an arm 33 which is adapted to operate the braking system for the rear wheels of the car. The systems for applying and releasing the brakes for the front and rear wheel systems are similar. The system for the front wheel brakes will now be described. Similar numerals, primed, are used for the rear wheel system, the operation and construction being substantially identical.

The front wheel system comprises a connecting link 34 pivoted at 35 to the arm 32. The other end of the connecting link 34 is pivoted at 36 to an arm 37 attached to a shaft 38. The shaft 38 is suitably journaled in the supporting framework of the truck which carries the wheels 14. Shaft 38 carries at either end arms 39 to which are pivoted at 40 links 41. The links 41 are pivoted at 42 to toggle arms 43 pivoted at 44 to the toggle pivot of brake shoes 45 which are adapted to bear against the wheels 14.

The brake shoes 45 are supported by means of suspension links 46 which are pivoted to supporting rods 47 which in turn are suitably supported by the framework of the truck.

Tension spring elements 50 are attached at their upper ends to the upper surface 3 of the cradle and at their lower ends to loop members 26 through which the shaft 5 passes. A front support member 51 is provided for the front end of the cradle 2, and a support member 52 for the back end of the cradle 2.

It is understood that at the beginning of the run for the takeoff, the parts are in the position shown in Figure 1, in which the flying boat 1, or other airplane, is in a no-lift or approximately no-lift attitude. In this position the front part of the cradle is against support 51. In this position the brakes are off, and the springs 50 are under tension.

In the position of the parts shown in Figure 1, the pivoted contact member 20 is in contact with the bottom of the flying boat and is held in the down position, tensioning the springs 50 and holding the parts in such position that the brakes for both the front and rear braking systems are in the "off" position. Let us assume, now, that the airplane and car have attained a sufficient speed to permit the airplane to take to the air. The pilot at that time manipulates his controls to cause the airplane to tilt on the cradle 2, causing the rear of the cradle to contact with support 52. Assuming the speed to be sufficient to permit the airplane to take to the air, the body unit or other part of the airplane, which has been in contact with the contact member 20, is raised from the cradle and the contact member 20, which is pivoted at 21, rises into the "up" position, the springs 50 causing it to move upwardly until the shaft 5 rests against the bottom of the loop members 26. This pulls up on links 28, which in turn causes rocker arms 30 to rotate the shaft 31 in a clockwise direction, looking at the parts from the position in which Figure 4 was taken.

This causes rods 34 and 34' to be pulled toward the center of the car, rocking shaft 38, 38'. Through arms 39 and 39', links 41 and 41' are pulled upwardly to cause the toggles 43 and 43' to apply the brake shoes for both the front and the rear braking systems.

Thus the car is brought to rest shortly after the airplane leaves the cradle and takes to the air.

When an airplane is placed again on the cradle, the pivoted contact element 20 is forced downward against the tension of the springs 50 and the reverse motions take place to those just described, releasing the brake shoes from contact with the wheels 14 for both the front and the rear systems of brakes.

Our system provides an important safety factor in applying the brakes to the vehicle from which the airplane takes to the air. It is possible under certain conditions to eliminate the arresting gear cable construction and to rely solely on the automatic application of the brakes to the car wheels when the airplane leaves the car. Ordinarily, however, we contemplate that we will supplement the automatic application of the brakes with the action of arresting gear cables.

It is to be noted that the catches 16 mounted at either end of the car are adapted to engage arresting cables 100 near either end of the rail track, one of which is diagrammatically shown adjacent the left hand catch of Figure 1. The mechanism for applying tension through the arresting cables is well known, and need not be here described. The arresting gear cable is adapted to enter the throat 101 of the catch 16, pushing aside the pivoted latch 102 which falls into place after the cable has passed to the bottom of the throat 101.

The arresting gear cable is adapted to supplement the brakes, which have been fully described. Under certain operating conditions the car will be arrested by the brakes alone. Under other conditions, the arresting gear cables 100 will be brought into play to assist the brakes. This dual system, in which the brakes on the car are supplemented by the arresting gear cable action, is one which has a high safety factor.

The center of gravity of the airplane is about one quarter chord distance from the leading edge of the wing in most cases. In the present drawings the airplane is shown a little to the rear of the preferred position in the cradle. It is desirable that the center of gravity of the airplane in the cradle be a little forward of the cradle pivot so that the airplane will easily remain in the position indicated in Figure 1, with the cradle contacting the forward support.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention, or exceeding the scope of the appended claims.

We claim:

1. A device for launching an airplane comprising a vehicle, a cradle pivoted on the vehicle upon which the airplane is adapted to rest, a contact element adapted to contact the fuselage of the airplane, brakes on the vehicle, and means cooperating with said contact element to apply the brakes on the vehicle when the airplane has left the cradle.

2. A device for launching an airplane comprising a vehicle, a pivoted cradle on the vehicle upon which the fuselage of the airplane is adapted to be carried, braking means for arresting the vehicle, and means operative upon the airplane taking to the air from the cradle to apply the braking means.

3. A device for launching an airplane comprising a track, a vehicle on the track, a pivoted cradle on the vehicle upon which the airplane is adapted to be supported, a contact element adapted to contact the fuselage of the airplane, brakes on the vehicle, and means cooperating with said contact element to apply the brakes on the vehicle.

4. A device for launching an airplane comprising a vehicle, a pivoted cradle on the vehicle within which is adapted to be supported the airplane, a contact element adapted to engage the fuselage of the airplane and carried by the pivoted cradle, braking means for arresting the vehicle, spring means adapted to hold the contact element in contact with the airplane, and means operated by the spring means to apply the braking means when the airplane is out of contact with the contact element.

5. A device for launching an airplane comprising a vehicle, a cradle pivoted on the vehicle and in which the airplane is supported, a pivoted contact element supported by the cradle and adapted to contact the bottom of the body unit of the airplane, braking means for arresting the vehicle, a tension spring element urging the pivoted contact element against the body unit, and means operated by the tension spring element to apply the braking means when the body unit is out of contact with the contact element.

6. A device for launching an airplane comprising a track, a vehicle with wheels on the track, a pivoted cradle upon which the airplane is adapted to rest, a contact element adapted to contact the airplane, said contact element being pivoted on the cradle and in contact with the body unit of the airplane, brakes for the wheels of the vehicle, linkages joining the brakes and the contact element, and spring means urging the linkages to apply the brakes operative to apply them when contact has been broken between the body unit and the contact element.

7. A device for launching an airplane comprising a rail track, a vehicle with wheels on the track, a pivoted cradle in which the airplane is supported on the vehicle, a pivoted contact element on the cradle adapted to contact the body unit of the airplane, brakes for the wheels of the vehicle, linkages joining the brakes and the pivoted contact element, and spring means urging the linkages to apply the brakes operative to apply them when contact has been broken between the airplane and the contact element.

8. A device for launching an airplane comprising a vehicle, a pivoted cradle on the vehicle within which is adapted to be supported the airplane, a contact element associated with said cradle adapted to engage the fuselage of the airplane, braking means for arresting the vehicle and means operated by said contact element to apply the brakes when the airplane is out of engagement with the contact element.

9. A device for launching an airplane comprising a vehicle, a pivoted cradle on the vehicle within which is adapted to be supported the airplane, a contact element adapted to engage the airplane and carried by the pivoted cradle, brakes for arresting the vehicle, means to urge the contact element against the airplane, and means operated by said first mentioned means to apply the brakes when the airplane is out of contact with the contact element.

10. A device for launching an airplane comprising a vehicle, a pivoted cradle on the vehicle within which is adapted to be supported the airplane, a contact element associated with the cradle and adapted to engage the airplane, brakes for arresting the vehicle, means to urge the contact element against the airplane, and means operated by said first mentioned means to apply the brakes when the airplane is out of contact with the contact element.

REUBEN H. FLEET.
WILLIAM B. WHEATLEY.
ISAAC M. LADDON.